H. KLÄGER.
MEASURING APPARATUS.
APPLICATION FILED MAY 13, 1915. RENEWED NOV. 23, 1918.
1,308,179.
Patented July 1, 1919.
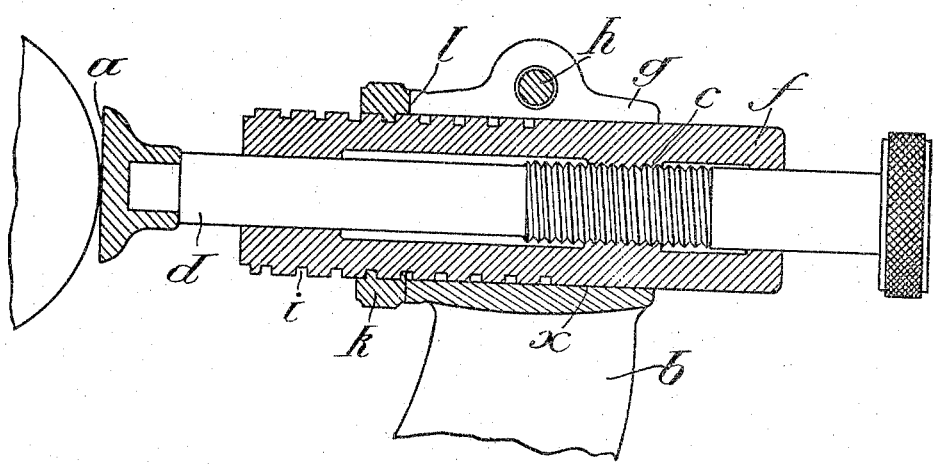
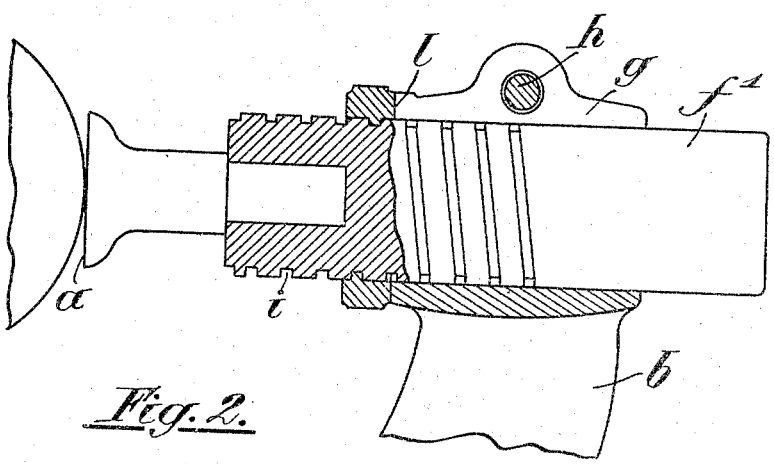

UNITED STATES PATENT OFFICE.

HERMANN KLÄGER, OF STUTTGART, GERMANY, ASSIGNOR TO THE FIRM OF FORTUNA-WERKE, SPECIALMASCHINENFABRIK, G. M. B. H., OF STUTTGART-CANNSTATT, GERMANY.

MEASURING APPARATUS.

1,308,179.      Specification of Letters Patent.      Patented July 1, 1919.

Application filed May 13, 1915, Serial No. 27,839. Renewed November 23, 1918. Serial No. 263,937.

*To all whom it may concern:*

Be it known that I, HERMANN KLÄGER, of 22 Keplerstrasse, Stuttgart, in the Kingdom of Württemberg, German Empire, civil engineer, have invented certain new and useful Improvements in Measuring Apparatus, of which the following is a specification.

My invention relates to accurate measuring apparatus such as snap gages and more especially to the means for accurately and rigidly fixing the movable parts of such instruments against any subsequent displacement.

In order to enlarge the range of measuring of accurate measuring instruments such as for instance caliper or snap gages one of the measuring jaw bolts is in some cases made displaceable within a suitable guide, a clamping device of some suitable kind being provided for accurately fixing the shiftable jaw bolt or measuring bolt within the guide as soon as the correct position is reached.

Experiments made with highly sensitive and accurate measuring apparatus of this kind have shown that it is not possible to secure, by means of such clamping devices, an absolutely firm and safe fixation of the measuring bolt. In practical use such measuring apparatus have shown a scarcely perceptible but nevertheless prejudicial ulterior change of position of the clamped measuring bolt caused by the inevitable pressure exerted upon the bolt by the object to be measured. Obviously it is impossible to obtain an absolutely rigid fixation of the measuring bolt by simple clamping, as forces acting along the clamping surfaces will always be able to bring about a still closer fitting together of the clamping surface and the bolt surface.

According to the present invention the fixing action of the clamping device is assisted by an auxiliary fixing device adapted to exert along the clamping surface an additional force exceeding the forces exerted upon the shiftable measuring bolt by the object to be measured.

In the drawings accompanying this specification two modifications of a device embodying my invention are shown.

Figure 1 is a vertical longitudinal section of the shiftable measuring bolt of a measuring instrument such as a snap gage.

Fig. 2 is another modification.

In the drawings $a$ is the contact surface of the shiftable measuring bolt of an accurate measuring device, $d$ is the spindle carrying said surface and provided with thread $c$. The spindle passes through a cylindrical bore of the measuring bolt $f$ provided with internal thread and with external ordinary thread $i$. The bolt is located in the bearing formed by the jaws $g$ of an arm $b$ and can be clamped fast between said jaws by aid of a screw bolt $h$ passing through the upper part of the jaws. A nut $k$ is arranged on the screw threaded part of the bolt $f$ in front of the face $l$ of the jaws.

After the bolt $f$ has been fixed in accurate position by screwing bolt $h$ into the jaws and thereby clamping the measuring bolt between the jaws, the nut $k$ is brought to bear firmly against face $l$, thus rendering the bolt $f$ absolutely immovable in a longitudinal direction away from the object to be measured.

In the modified form of apparatus shown in Fig. 2 the contact piece is fastened directly to a full screw threaded bolt $f'$, the micrometer adjusting arrangement being dropped here.

I wish it to be understood that while the new device is designed in the first place for measuring instruments, it might as well be applied with advantage to a number of other machines or apparatus such as machine tools, where it is desired to prevent contact surfaces from being displaced in a vertical direction.

The invention can be applied also with advantage in all those cases where it is desired to solidly fix a movable abutment or the like in any desired position, such as for instance in machine tools.

I claim:—

1. In an accurate measuring apparatus in combination, a bearing, a measuring bolt shiftably located in said bearing, clamping means for rendering the measuring bolt immovable within said bearing, there being external screw thread on said measuring bolt and a counter-nut on the screw threaded part of said measuring bolt adapted to be brought in contact with the front face of said clamping means.

2. In an accurate measuring apparatus in combination, a bearing, a measuring bolt located in said bearing, a spindle located in said measuring bolt, there being a screw thread on said spindle and in said measuring bolt, a contact piece fixed to said spindle, there being external screw thread on said measuring bolt, clamping means for rendering the measuring bolt immovable within said bearing and a counter-nut on the screw threaded part of said measuring bolt adapted to be brought in contact with the front face of said bearing.

3. In an accurate measuring apparatus, in combination, a bearing, a directly shiftable measuring bolt disposed in said bearing, said measuring bolt having an external screw-threaded portion protruding from said bearing, said bearing constituting clamping means whereby said bolt may be firmly positioned, and auxiliary means for insuring positive positioning of said measuring bolt consisting of a counter-nut placed on the threaded portion of said measuring bolt and adapted to be brought in contact with said bearing.

In testimony whereof, I affix my signature, in presence of two witnesses.

HERMANN KLAEGER.

Witnesses:
ERNEST ENTENMANN,
FRIDA KLAIBER.

Copies of this patent may be obtained for five cents each, by addressing the "Commissioner of Patents, Washington, D. C."